J. R. BLAINE.
INDICATING DEVICE.
APPLICATION FILED JAN. 22, 1914.

1,155,788.

Patented Oct. 5, 1915.
2 SHEETS—SHEET 1.

WITNESSES
C. B. Schroeder
L. Bates

INVENTOR
J. R. Blaine
BY
Arba B. Marvin
ATTORNEY

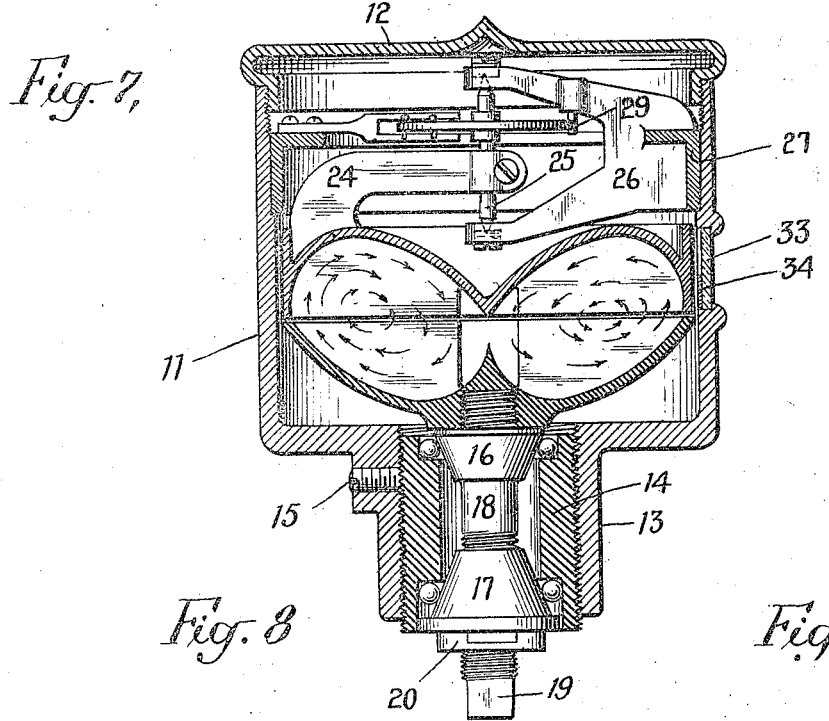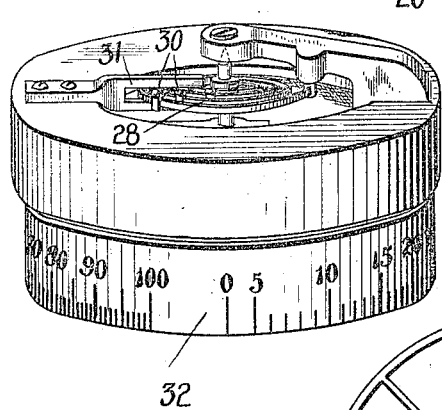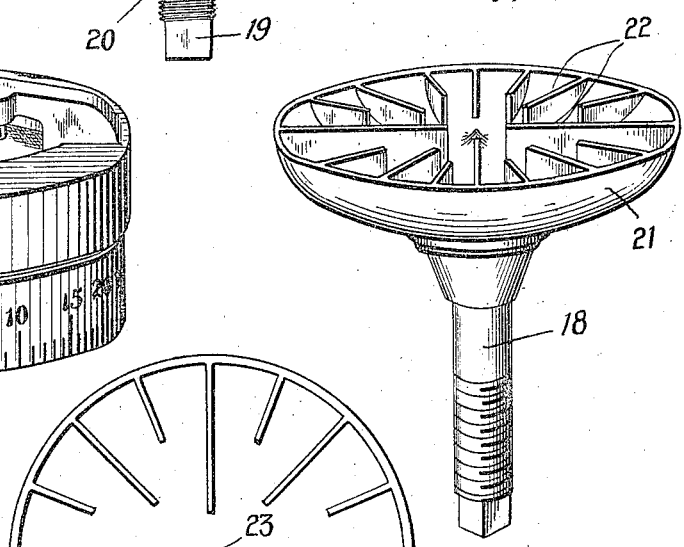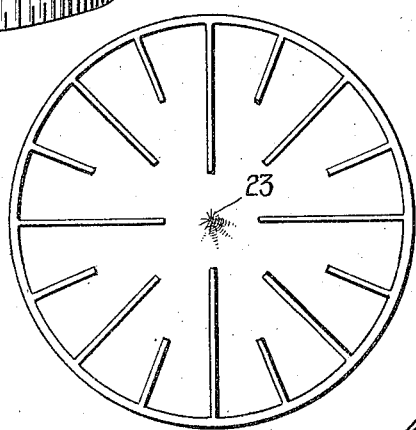

UNITED STATES PATENT OFFICE.

JOSEPH R. BLAINE, OF TAUNTON, MASSACHUSETTS.

INDICATING DEVICE.

1,155,788. Specification of Letters Patent. Patented Oct. 5, 1915.

Application filed January 22, 1914. Serial No. 813,624.

*To all whom it may concern:*

Be it known that I, JOSEPH R. BLAINE, a citizen of the United States, and residing at Taunton, county of Bristol, and State of Massachusetts, have invented certain new and useful Improvements in Indicating Devices; and I do hereby declare the following to be a full, clear, and exact description of the invention, such as will enable others skilled in the art to which it appertains to make and use the same.

It is the object of the present invention to provide indicating means suitable for use in measuring devices of various kinds, and more particularly to provide a spring mechanism so arranged that the action of the spring may be varied in accordance with the demands on it, or in accordance with other needs of the instrument as a whole.

The generic features of the present invention may be applied to electrical measuring instruments, to temperature measuring devices, and the like, and is well suited for use in connection with speed indicators, as hereinafter explained more in detail.

The objects and advantages of the invention will be made clear by the following detailed description, which is to be taken in conjunction with the accompanying drawings, wherein—

Figure 1:
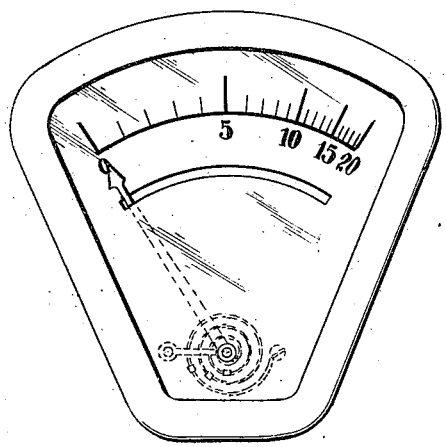
Figure 2:
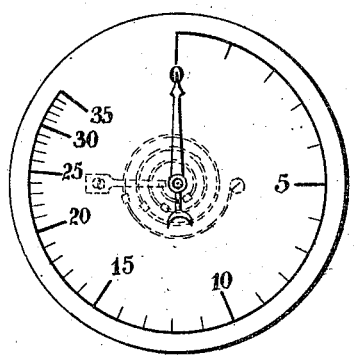
Figure 3:
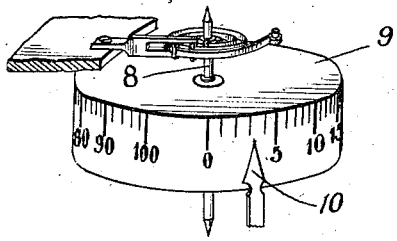
Figure 4:
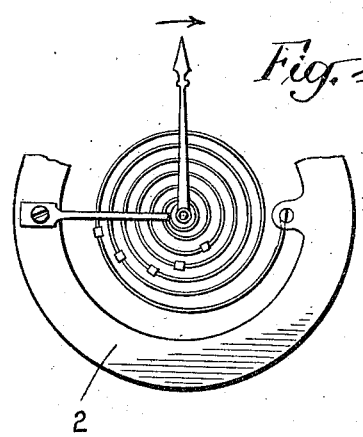
Figure 5:
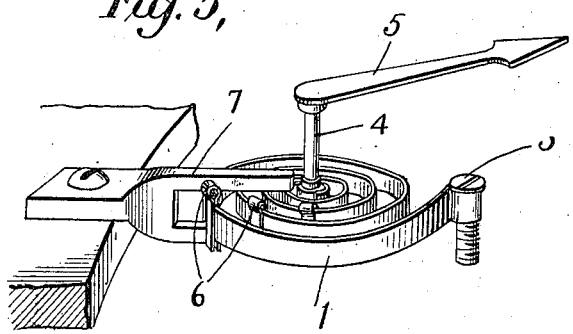
Figure 6:
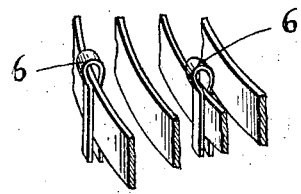

Figure 1 shows the invention applied to an electrical measuring instrument, the indicating means being in the form of a pointer swinging over a fixed scale. Fig. 2 illustrates another arrangement of the scale. Fig. 3 shows a modification wherein the scale moves with the spring and the pointer is stationary. Fig. 4 is a detail of the spring showing the stops and the arms against which these stops strike. and Fig. 5 is a perspective view of the structure shown in Fig. 4. Fig. 6 shows the mounting of the stops on the spring. Fig. 7 is a sectional elevation through a speed indicator. Fig. 8 is a perspective view of the spring and the indicating means together with their supports, and Figs. 9 and 10 show in perspective and in plan view the lower cup of the pneumatic driving means whereby the indicator of the speed measuring device is actuated.

The apparatus of Fig. 1 is provided with a spring and indicating means of the type shown in detail in Figs. 4, 5 and 6, and may be an electrical instrument such as an ammeter or voltmeter. The suring 1 is of spiral outline anchored to the frame 2 of the instrument by means of a suitable screw 3 and attached at its inner free end to a standard 4 bearing a pointer 5, or other suitable indicating means. Stops 6 are mounted on the spring and may be in the form of metal clips each slipped on over one of the turns of the spring, as indicated in Fig. 6. They may be soldered in place or the resiliency of the stop itself may be relied on to insure a tight grip on the spring, the latter arrangement having the advantage that any stop can be shifted along the spring in making adjustments or in calibrating. Projecting from frame 2 is an arm 7 preferably having upper and lower legs and serving as an abutment against which the stops 6 of the spring may strike in succession. This arm 7 by limiting the forward movement of successive turns of the spring shortens the effective length of the spring and renders necessary a stronger proportional torque.

The driving mechanism whereby the pointer and its spring are turned are not here shown, but may be of forms usual in electrical indicating instruments, thermometers, and the like, to which this improvement is to be applied. If the turning moment is uniform throughout, the scale reading can, by use of this invention, be graduated, as shown in Fig. 1, to afford a wide swing for the needle at low values and relatively small angular movement for high values, thereby getting a large total scale reading with a small angular displacement of the pointer.

In Fig. 2 the arrangement is much the same as in Fig. 1, except for a difference in the scale arrangement, the needle being allowed to travel farther. Of course with an instrument having a turning moment which itself is variable, as, for instance, increasing with the square of the movement, the stops can be positioned on the spring to counteract this by giving a shorter effective length to the spring as the angular displacement increases and the scale may be arranged with spacings of equal width throughout, the tightening of the spring being relied on to counteract the increase in turning moment of the instrument.

In the modification illustrated in Fig. 3, the inner free end of the spring is connected to a staff 8 adapted to turn within suitable bearings and carrying an indicating means in the form of a cylinder 9 with scale readings on its periphery. This cylinder turns with the spring in front of a stationary pointer 10. In this embodiment the spring and its stops and the arm against which these stops strike are essentially the same as in Figs. 4, 5 and 6. This modification of Fig. 3 is particularly advantageous for use in speed indicators, as shown more in detail in Figs. 7 to 10, inclusive.

In the construction illustrated by Figs. 7 to 10, the speed indicator comprises a cup 11 with a screw cover 12, and with a threaded throat 13 provided with a collar 14, the top and bottom edges of which are cut away to form ball races. A set screw 15 locks the collar in place. Supported within collar 14, and carrying bearing cones 16 and 17, is a shaft 18, the lower end of which is preferably squared at 19 for connection with a flexible driving shaft leading to the gears of the automobile wheel, or other moving element, the speed or travel of which is to be indicated. Cone 16 may be threaded on shaft 18 or made integral therewith, and cone 17 is preferably threaded thereon so that the bearing is adjustable and may be easily dismantled, and is locked in place by a nut 20.

At the upper end of shaft 18 and threaded thereto is a driving member of the pneumatic element used for actuating the indicating means. This driving member is in the form of a cup 21 having vertical baffle plates 22, some at least of which extend inward almost to the center of the cup, but others of which may project inward only a fraction of that distance. All of these baffles have their upper edges terminating in the horizontal plane of the rim of the cup. The center of the cup rises to form a cone 23, whereby the air currents are distributed when the cup is in motion driving its opposing element as hereinafter explained.

Mounted above the driving cup 21 is a driven member supported on an arm 24 slung from a staff 25, the upper and lower ends of which are held in bearing blocks carried by a forked support 26. This support is attached to or forms part of a ring 27 permanently secured to the walls of cup 11. Staff 25 is attached to the inner or free end of a coiled spring 28, the other end of that spring being anchored to a post 29 projecting from the upper arm of the support 26. Stops 30 are provided on the the spring and an arm 31 projects into the path of those stops to limit the forward movement of the sections of the spring controlled thereby.

The lower part of the driven member is shaped in the form of a cylinder 32 (Fig. 8), and bears a scale suitably calibrated, the numerals of this scale being visible through a glass window 33 positioned in the side wall of cup 11 behind which is a marked strip 34, or other suitable device, for indicating the particular point to be read from the moving scale.

The lower face of the driven member is recessed to form a cup having baffle plates comparable to those of the driving member (Fig. 9), but arranged in complementary configuration to form elliptical pockets, as indicated in Fig. 7. The upper edges of the driving cup and the lower edges of the driven member are spaced apart only enough for clearance.

When the driving member rotates under the compelling movement of the flexible coupling, the air held between the baffles of cup 21 moves out under centrifugal action toward the rim of the cup and finally escapes upward into the opposing pockets of the driven member where by its energy of motion it acts to give a turning moment to the driven member swinging it around against the tension of its coiled spring, and presenting at the window 33 a scale reading indicative of the speed of rotation of the driving member.

The circulation of air currents within the driving and driven members is indicated somewhat diagrammatically in Fig. 7, and depends somewhat on the exact configuration of the baffles and on the speed of movement of the driving element, but whatever may be the mathematical relation between the speed of the driving member and the speed of the driven member, adequate compensation can be made by suitably spacing the stops 30 on the coiled spring 28 when the indicator is being calibrated and the scale is being laid out on the periphery of cylinder 32.

While the speed indicator of Fig. 7 embodies an advantageous application of the spring with its controlling stops, various novel features of the present invention are of wider application and may be used in indicating instruments of many different kinds, as will be clear to those skilled in the arts.

I claim:

1. In a measuring device, indicating means, a spring for controlling the movement of said indicating means, stops on said spring and a rigid arm positioned to arrest the movement of said stops when the tension on said spring is increased, thereby regulating the movement of said indicating means.

2. In a measuring device, indicating means, a spiral spring for controlling the movement of said indicating means, one end of said spring being free to move with said indicating means and the other end being fixed, stops adjustably mounted on said spring and a rigid arm positioned to arrest the forward movement of said stops, thereby increasing the tension on the spring by shortening its effective length.

3. The combination of a spiral spring fixed at its outer end and free to turn at its inner end, a series of adjustable stops mounted thereon and a rigid stationary arm for limiting the forward movement of said stops whereby parts of the spring may be in effect cut out of action, substantially as described.

4. In a measuring device, indicating means comprising a cylinder with scale markings thereon, a pivotal support about which said cylinder may turn, a spring for controlling the movement of said cylinder, stops on said spring and a rigid arm positioned to arrest the movement of said stops and thereby in effect cut out parts of said spring as the indicating means turns on its pivotal support.

5. In a measuring device, an indicating means in the form of a cylinder bearing a scale marking, a spiral spring fixed at its outer end and having its inner end connected with said cylinder, a pivotal mounting whereon said spring and cylinder may turn, stops on said spring and an arm positioned to arrest said stops in succession as said cylinder and spring turn on their pivotal mounting.

6. In a measuring device, a cupped driving member and a cupped driven member, said members having communicating air pockets establishing an effective driving connection between the two, scale markings at the periphery of the cupped driven member, a coiled spring having its inner free end connected with the driven member, a pivotal mounting for said spring and said driven member, stops on said spring and an arm positioned to intercept said stops when the driven member swings on its pivotal mounting in response to the turning action of air currents from the driving member.

7. In a speed indicator, the combination of a cupped driving member having air pockets, a pivotally mounted driven member suspended above said driving member and having opposing air pockets, scale markings on the periphery of said driven member, a coiled spring with its outer end fixed and its inner end connected to move with said driven member, stops on said spring and a rigid stationary arm for intercepting the forward movement of said stops when the driven member swings on its pivotal mounting under the driving action of air currents from the pockets of the driving member.

In testimony whereof I affix my signatuhe, in presence of two witnesses.

JOSEPH R. BLAINE.

Witnesses:
EDWIN KEITH,
ALFRED F. KENRICK.